US012118618B2

(12) United States Patent
Astle et al.

(10) Patent No.: US 12,118,618 B2
(45) Date of Patent: Oct. 15, 2024

(54) TECHNOLOGY FOR USER-ENABLED USE RESTRICTIONS ON USER-AUTHORIZED FINANCIAL INSTRUMENT

(71) Applicant: Truist Bank, Charlotte, NC (US)

(72) Inventors: Hope Astle, Charlotte, NC (US); Adam Rogers, Charlotte, NC (US); Erik Schutzman, Charlotte, NC (US); Sarah Massagee, Charlotte, NC (US); Joel Baker, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/164,857

(22) Filed: Feb. 6, 2023

(65) Prior Publication Data

US 2024/0265454 A1 Aug. 8, 2024

(51) Int. Cl.
*G06Q 40/00* (2023.01)
*G06Q 40/06* (2012.01)
(52) U.S. Cl.
CPC .................................. *G06Q 40/06* (2013.01)
(58) Field of Classification Search
CPC .............................. G06Q 40/00; G06Q 40/06
See application file for complete search history.

(56) References Cited

U.S. PATENT DOCUMENTS

| | | | | |
|---|---|---|---|---|
| 11,574,359 | B1* | 2/2023 | Ball | G06Q 40/02 |
| 2009/0076966 | A1* | 3/2009 | Bishop | G06Q 20/363 |
| | | | | 705/67 |
| 2013/0290187 | A1* | 10/2013 | Itwaru | G06Q 20/3227 |
| | | | | 705/44 |
| 2015/0235225 | A1* | 8/2015 | Christie | G06K 19/16 |
| | | | | 705/72 |
| 2015/0254645 | A1* | 9/2015 | Bondesen | G06Q 20/385 |
| | | | | 705/41 |
| 2017/0132719 | A1* | 5/2017 | Rogers | G06Q 40/12 |

FOREIGN PATENT DOCUMENTS

WO WO-2004095228 A2 * 11/2004 ............. G06Q 20/04

OTHER PUBLICATIONS

Cash versus debit card: the role of budget control L Hernandez, N Jonker, A Kosse—Journal of Consumer Affairs, 2017—Wiley Online Library (Year: 2017).*

* cited by examiner

*Primary Examiner* — Lalita M Hamilton
(74) *Attorney, Agent, or Firm* — Jordan IP Law, LLC; Todd A. Vaughn

(57) ABSTRACT

A computing device, a computer program product, and a computer-implemented method for delivering enhanced financial services and, more particularly, for facilitating enhanced network communication between a user and a financial institution via a client device. A digital financial management platform for the client device is provided that includes one or more user-engageable use restriction input settings to enable one or more use restrictions on one or more user-authorized financial payment instruments associated with one or more financial accounts maintained by the user at a financial institution. The one or more user-engageable use restriction input settings includes a predetermined spend limit input setting having a predetermined maximum spend limit that is based on a current user status level among a plurality of user status levels associated with the one or more financial accounts. Each user status level in the plurality of user status levels is based on the accumulated overall financial assets of the one or more financial accounts.

15 Claims, 15 Drawing Sheets

1300

Cause visual display of GUI comprising user-engagement use restriction input setting(s) for user-authorized financial payment instrument, including a user-engageable predetermined spend limit input setting, a user-engageable predetermined start date input setting and a user-engageable predetermined end date input setting
1302

Receive/Acquire use restriction input setting(s) from client device
1304

Detect financial transaction using user-authorized financial payment instrument
1306

Execute financial transaction analysis
1308

Transmit electronic notification to client device
1308

```
┌─────────────────────────────────────────────────────────────────┐
│ Cause visual display of GUI comprising user-engagement use      │
│ restriction input setting(s) for user-authorized financial      │
│ payment instrument, including a user-engageable predetermined   │
│ spend limit input setting, a user-engageable predetermined      │
│ start date input setting and a user-engageable predetermined    │
│ end date input setting                                          │
│ 1402                                                            │
└─────────────────────────────────────────────────────────────────┘
                                │
                                ▼
┌─────────────────────────────────────────────────────────────────┐
│ Receive/Acquire use restriction input setting(s) from client    │
│ device                                                          │
│ 1404                                                            │
└─────────────────────────────────────────────────────────────────┘
                                │
                                ▼
┌─────────────────────────────────────────────────────────────────┐
│ Store use restriction input setting(s) in storage location      │
│ 1406                                                            │
└─────────────────────────────────────────────────────────────────┘
```

Cause visual display of GUI comprising user-engagement use restriction input setting(s) for user-authorized financial payment instrument, including a user-engageable predetermined spend limit input setting, a user-engageable predetermined start date input setting and a user-engageable predetermined end date input setting
1502

TECHNOLOGY FOR USER-ENABLED USE RESTRICTIONS ON USER-AUTHORIZED FINANCIAL INSTRUMENT

TECHNICAL FIELD

The present disclosure relates to a computing device, computer program product, and computer-implemented method for delivering digital financial services and, more particularly, for facilitating the management of one or more financial payment instruments by a user.

BACKGROUND

Financial institutions that provide financial services are increasingly providing a greater number of client services. Such financial institutions offer services that include offering a digital wallet, i.e., a digitized version of a physical credit card or physical debit card that is stored in a digital wallet platform of a client device.

SUMMARY

The present disclosure relates to a computing device, a computer program product, and a computer-implemented method for delivering enhanced digital financial services over a communication network by providing a digital financial management platform for a client device that includes one or more user-engageable use restriction input settings to enable one or more use restrictions on one or more user-authorized financial payment instruments associated with one or more financial accounts maintained at a financial institution. The type of financial accounts associated with the digital financial management platform include, but is not limited to, any user financial account associated with a personal account and a commercial account. Example financial accounts may include, but is not limited to, checking accounts, savings accounts, etc.

In accordance with one or more embodiments set forth, illustrated, and described herein, the one or more user-authorized financial payments instruments comprise a physical debit card.

In accordance with one or more embodiments set forth, illustrated, and described herein, the one or more user-authorized financial payment instruments comprise a virtual debit card.

In accordance with one or more embodiments set forth, illustrated, and described herein, the one or more user-authorized financial payment instruments comprise a digital wallet.

In accordance with one or more embodiments set forth, illustrated, and described herein, the one or more use restrictions comprise a predetermined financial transaction threshold (i.e., a predetermined spend limit) associated with financial transactions (including withdrawals) made using one or more user-authorized financial payment instruments associated with a personal account maintained by a user (i.e., a financial account holder) at the financial institution.

In accordance with one or more embodiments set forth, illustrated, and described herein, the predetermined spend limit comprises a predetermined maximum spend limit.

In accordance with one or more embodiments set forth, illustrated, and described herein, the predetermined maximum spend limit is based on a current user status level among a plurality of user status levels associated with the one or more financial accounts maintained the financial institution.

In accordance with one or more embodiments set forth, illustrated, and described herein, each user status level in the plurality of user status levels is based on the accumulated overall financial assets of the one or more financial accounts.

In accordance with one or more embodiments set forth, illustrated, and described herein, the one or more use restrictions comprises a predetermined temporal threshold (i.e., a predetermined time limit) associated with the predetermined spend limit.

In accordance with one or more embodiments set forth, illustrated, and described herein, the predetermined temporal threshold comprises a predetermined start date and a predetermined end date.

In accordance with one or more embodiments set forth, illustrated, and described herein, the financial account holder may, via the financial institution mobile application software or desktop application software executing on the client device, dynamically receive one or more visual alerts and/or electronic notifications (e.g., email, text, pop-up, etc.) that visually displays an indication that the predetermined end date has expired.

In accordance with one or more embodiments set forth, illustrated, and described herein, an apparatus may comprise one or more of the following: one or more processors; and a non-transitory memory coupled to the one or more processors, the non-transitory memory including a set of instructions of computer-executable program code, which when executed by the one or more processors, cause the apparatus to: cause, in response to execution of mobile application software or desktop application software associated with a financial institution on a client device of a user having one or more financial accounts maintained at the financial institution, visual display of a graphical user interface (GUI) on a user interface of the client device, the GUI comprising one or more user-engageable use restriction input settings to facilitate a placement of one or more use restrictions on a user-authorized financial payment instrument associated with the one or more financial accounts, the one or more user-engageable use restriction input settings comprising a predetermined spend limit input setting having a predetermined maximum spend limit that is based on a current user status level among a plurality of user status levels associated with the one or more financial accounts.

In accordance with one or more embodiments set forth, illustrated, and described herein, an apparatus may comprise one or more of the following: one or more processors; and a non-transitory memory coupled to the one or more processors, the non-transitory memory including a set of instructions of computer-executable program code, which when executed by the one or more processors, cause the apparatus to: receive, from a client device of a user having one or more primary financial accounts at a financial institution, one or more use restrictions input settings for a user-authorized financial payment instrument associated with the one or more financial accounts, the one or more use restriction input settings comprising a predetermined spend limit input setting having a predetermined maximum spend limit that is based on a current user status level among a plurality of user status levels associated with the one or more financial accounts; detect, in response to the receipt of the one or more use restrictions input settings, a financial transaction having a monetary amount that is paid via the user-authorized financial payment instrument; execute, in response to the detection, financial transaction analysis based on stored user account settings data associated with the one or more use restriction input settings; and transmit, based on the financial transaction analysis, an electronic notification to the client device.

In accordance with each respective apparatus, the set of instructions, which when executed by the one or more processors, cause the apparatus to return the predetermined spend limit to a default status in response to an expiration of the predetermined end date.

In accordance with each respective apparatus, the set of instructions, which when executed by the one or more processors, cause the apparatus to transmit, in response to the expiration of a predetermined end date of the predetermined spend limit, an electronic notification to the client device that visually displays an indication that the predetermined end date has expired.

In accordance with each respective apparatus, the set of instructions, which when executed by the one or more processors, cause the apparatus to detect a financial transaction by the user-authorized financial payment instrument for a monetary amount.

In accordance with each respective apparatus, the set of instructions, which when executed by the one or more processors, cause the apparatus to execute, in response to the detection, financial transaction analysis based on stored user account settings data associated with the one or more user-engageable use restriction input settings.

In accordance with each respective apparatus, the set of instructions, which when executed by the one or more processors, cause the apparatus to execute the financial transaction analysis by determining if the monetary amount of the financial transaction is greater than the predetermined spend limit.

In accordance with each respective apparatus, the set of instructions, which when executed by the one or more processors, cause the apparatus to execute the financial transaction analysis by conducting a comparison between the monetary amount and the predetermined spend limit.

In accordance with each respective apparatus, the set of instructions, which when executed by the one or more processors, cause the apparatus to decline the financial transaction when the monetary amount is greater than the predetermined spend limit.

In accordance with each respective apparatus, the set of instructions, which when executed by the one or more processors, cause the apparatus to transmit, based on the financial transaction analysis, an electronic notification to the client device that visually displays an indication that the financial transaction was declined.

In accordance with each respective apparatus, the electronic notification includes a user-engageable link that, when engaged by the user, facilitates viewing of a transaction history of the financial transaction.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to execute one or more of the following: cause, in response to execution of mobile application software or desktop application software associated with a financial institution on a client device of a user having one or more financial accounts maintained at the financial institution, visual display of a graphical user interface (GUI) on a user interface of the client device, the GUI comprising one or more user-engageable use restriction input settings to facilitate a placement of one or more use restrictions on a user-authorized financial payment instrument associated with the one or more financial accounts, the one or more user-engageable use restriction input settings comprising a predetermined spend limit input setting having a predetermined maximum spend limit that is based on a current user status level among a plurality of user status levels associated with the one or more financial accounts.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to execute one or more of the following: receive, from a client device of a user having one or more primary financial accounts at a financial institution, one or more use restriction input settings for a user-authorized financial payment instrument associated with the one or more financial accounts, the one or more use restriction input settings comprising a predetermined spend limit input setting having a predetermined maximum spend limit that is based on a current user status level among a plurality of user status levels associated with the one or more financial accounts; detect, in response to the receipt of the one or more use restriction input settings, a financial transaction having a monetary amount that is paid via the user-authorized financial payment instrument; execute, in response to the detection, financial transaction analysis based on stored user account settings data associated with the one or more use restriction input settings; and transmit, based on the financial transaction analysis, an electronic notification to the client device that includes a user-engageable link that, when engaged by the user, facilitates viewing of a transaction history of the financial transaction.

In accordance with each respective computer program product, the set of instructions, which when executed by the one or more processors, cause the apparatus to return the predetermined spend limit to a default status in response to an expiration of the predetermined end date.

In accordance with each respective computer program product, the set of instructions, which when executed by the one or more processors, cause the apparatus to transmit, in response to the expiration of a predetermined end date of the predetermined spend limit, an electronic notification to the client device that visually displays an indication that the predetermined end date has expired.

In accordance with each respective computer program product, the set of instructions, which when executed by the one or more processors, cause the apparatus to detect a financial transaction by the user-authorized financial payment instrument for a monetary amount.

In accordance with each respective computer program product, the set of instructions, which when executed by the one or more processors, cause the apparatus to execute, in response to the detection, financial transaction analysis based on stored user account settings data associated with the one or more user-engageable use restriction input settings.

In accordance with each respective computer program product, the set of instructions, which when executed by the one or more processors, cause the apparatus to execute the financial transaction analysis by determining if the monetary amount of the financial transaction is greater than the predetermined spend limit.

In accordance with each respective apparatus, the set of instructions, which when executed by the one or more processors, cause the apparatus to execute the financial transaction analysis by conducting a comparison between the monetary amount and the predetermined spend limit.

In accordance with each respective computer program product, the set of instructions, which when executed by the one or more processors, cause the apparatus to decline the financial transaction when the monetary amount is greater than the predetermined spend limit.

In accordance with each respective computer program product, the set of instructions, which when executed by the one or more processors, cause the apparatus to transmit, based on the financial transaction analysis, an electronic notification to the client device that visually displays an indication that the financial transaction was declined.

In accordance with each respective computer program product, the electronic notification includes a user-engageable link that, when engaged by the user, facilitates viewing of a transaction history of the financial transaction.

In accordance with one or more embodiments set forth, illustrated, and described herein, a computer-implemented method may comprise one or more of the following: causing, by one or more financial institution servers associated with a financial institution, in response to execution of mobile application software or desktop application software associated with the financial institution on a client device of a user having one or more financial accounts maintained at the financial institution, visual display of a graphical user interface (GUI) on a user interface of the client device, the GUI comprising one or more user-engageable use restriction input settings to facilitate a placement of one or more use restrictions on a user-authorized financial payment instrument associated with the one or more financial accounts, the one or more user-engageable use restriction input settings comprising a predetermined spend limit input setting having a predetermined maximum spend limit that is based on a current user status level among a plurality of user status levels associated with the one or more financial accounts.

In accordance with one or more embodiments set forth, illustrated, and described herein, a computer-implemented method may comprise one or more of the following: receiving, by one or more financial institution servers associated with a financial institution and from a client device of a user having one or more primary financial accounts maintained at the financial institution, one or more use restriction input settings for a user-authorized financial payment instrument associated with the one or more financial accounts, the one or more use restriction input settings comprising a predetermined spend limit input setting having a predetermined maximum spend limit that is based on a current user status level among a plurality of user status levels associated with the one or more financial accounts; detecting, by the one or more financial institution servers in response to the receipt of the one or more use restriction input settings, a financial transaction having a monetary amount that is paid via the user-authorized financial payment instrument; executing, by the one or more financial institution servers in response to the detection, financial transaction analysis based on stored user account settings data associated with the one or more use restriction input settings; and transmit, based on the financial transaction analysis, an electronic notification to the client device that includes a user-engageable link that, when engaged by the user, facilitates viewing of a transaction history of the financial transaction.

In accordance with each respective computer-implemented method, further comprising, by the one or more financial institution servers, returning the predetermined spend limit to a default status in response to an expiration of the predetermined end date.

In accordance with each respective computer-implemented method, further comprising, by the one or more financial institution servers, transmitting, in response to the expiration of a predetermined end date of the predetermined spend limit, an electronic notification to the client device that visually displays an indication that the predetermined end date has expired.

In accordance with each respective computer-implemented method, further comprising, by the one or more financial institution servers, detecting a financial transaction by the user-authorized financial payment instrument for a monetary amount.

In accordance with each respective computer-implemented method, further comprising, by the one or more financial institution servers, executing, in response to the detection, financial transaction analysis based on stored user account settings data associated with the one or more user-engageable use restriction input settings.

In accordance with each respective computer-implemented method, further comprising, by the one or more financial institution servers, executing the financial transaction analysis by determining if the monetary amount of the financial transaction is greater than the predetermined spend limit.

In accordance with each respective computer-implemented method, further comprising, by the one or more financial institution servers, executing the financial transaction analysis by conducting a comparison between the monetary amount and the predetermined spend limit.

In accordance with each respective computer-implemented method, further comprising, by the one or more financial institution servers, declining the financial transaction when the monetary amount is greater than the predetermined spend limit.

In accordance with each respective computer-implemented method, further comprising, by the one or more financial institution servers, transmitting, based on the financial transaction analysis, an electronic notification to the client device that visually displays an indication that the financial transaction was declined.

In accordance with each respective computer-implemented method, further comprising, the electronic notification includes a user-engageable link that, when engaged by the user, facilitates viewing of a transaction history of the financial transaction In accordance with one or more embodiments set forth, illustrated, and described herein, the user-authorized financial payment instrument comprises a physical debit card.

In accordance with one or more embodiments set forth, illustrated, and described herein, the user-authorized financial payment instrument comprises a virtual debit card.

In accordance with one or more embodiments set forth, illustrated, and described herein, the user-authorized financial payment instrument comprises a digital wallet.

In accordance with one or more embodiments set forth, illustrated, and described herein, each user status level in the plurality of user status levels is based on the accumulated overall financial assets of the one or more financial accounts.

In accordance with one or more embodiments set forth, illustrated, and described herein, the one or more user-engageable use restriction input settings further comprises a predetermined time limit input setting associated with the predetermined spend limit.

In accordance with one or more embodiments set forth, illustrated, and described herein, the predetermined time limit input setting comprises a predetermined start date input setting and a predetermined end date input setting.

DRAWINGS

The various advantages of the exemplary embodiments will become apparent to one skilled in the art by reading the following specification and appended claims, and by referencing the following drawings, in which:

Figure 1:
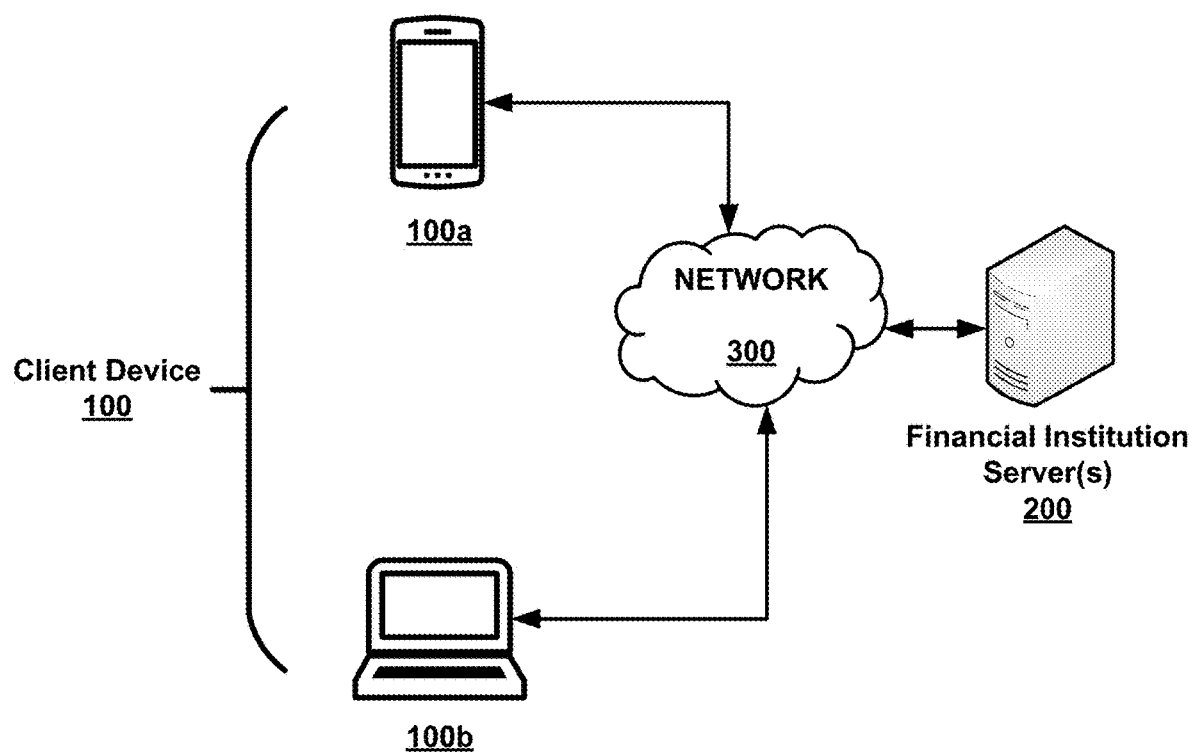
FIG. 1 illustrates a communication environment, in accordance with one or more embodiments set forth and described herein.

FIGS. 5 through 11 respectively illustrate a GUI for visual display on a user interface of a client device, in accordance with one or more embodiments set forth and described herein.

FIGS. 12 through 15 respectively illustrate a computer-implemented method, in accordance with one or more embodiments set forth and described herein.

DESCRIPTION

Hereinbelow are example definitions that are provided only for illustrative purposes in this disclosure, and should not be construed to limit the scope of the one or more embodiments disclosed herein in any manner. Some terms are defined below for purposes of clarity. These terms are not rigidly restricted to these definitions. This disclosure contemplates that these terms and other terms may also be defined by their use in the context of this description.

As used herein, "application" relates to software used on a computer (usually by a client and/or client device and can be applications that are targeted or supported by specific classes of machine, such as a mobile application, desktop application, tablet application, and/or enterprise application (e.g., client device application(s) on a client device). Applications may be separated into applications which reside on a client device (e.g., VPN, PowerPoint, Excel) and cloud applications which may reside in the cloud (e.g., Gmail, GitHub). Cloud applications may correspond to applications on the client device or may be other types such as social media applications (e.g., Facebook).

As used herein, "artificial intelligence (AI)" relates to one or more computer system operable to perform one or more tasks that normally require human intelligence, such as visual perception, speech recognition, decision-making, and translation between languages.

As used herein, "machine learning" relates to an application of AI that provides computer systems the ability to automatically learn and improve from data and experience without being explicitly programmed.

As used herein, "computer" relates to a single computer or to a system of interacting computers. A computer is a combination of a hardware system, a software operating system and perhaps one or more software application programs. Examples of a computer include without limitation a personal computer (PC), laptop computer, a smart phone, a cell phone, or a wireless tablet.

As used herein, "client device" relates to any device associated with a user, including personal computers, laptops, tablets, and/or mobile smartphones.

As used herein, "modules" relates to either software modules (e.g., code embodied on a machine-readable medium or in a transmission signal) or hardware modules.

Certain embodiments are described herein as including logic or a number of components, modules, or mechanisms. A "hardware module" (or just "hardware") as used herein is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as an FPGA or an ASIC. A hardware module may also include programmable logic or circuitry that is temporarily configured by software to perform certain operations. A hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access.

As used herein, "network" or "networks" relates to any combination of electronic communication networks, including without limitation the Internet, a local area network (LAN), a wide area network, a wireless network, and a cellular network (e.g., 4G, 5G).

As used herein, "processes" or "methods" are presented in terms of processes (or methods) or symbolic representations of operations on data stored as bits or binary digital signals within a machine memory (e.g., a computer memory). These processes or symbolic representations are examples of techniques used by those of ordinary skill in the data processing arts to convey the substance of their work to others skilled in the art. As used herein, a "process" is a self-consistent sequence of operations or similar processing leading to a desired result. In this context, processes and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information.

As used herein, "processor-Implemented module" relates to a hardware module implemented using one or more processors. The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein.

As used herein, "server" relates to a server computer or group of computers that acts to provide a service for a certain function or access to a network resource. A server may be a physical server, a hosted server in a virtual environment, or software code running on a platform.

As used herein, "service" or "application" relates to an online server (or set of servers), and can refer to a web site and/or web application.

As used herein, "software" relates to a set of instructions and associated documentations that tells a computer what to do or how to perform a task. Software includes all different software programs on a computer, such as applications and the operating system. A software application could be written in substantially any suitable programming language, which could easily be selected by one of ordinary skill in the art. The programming language chosen should be compatible with the computer by which the software application is to be executed and, in particular, with the operating system of that computer. Examples of suitable programming languages include without limitation Object Pascal, C, C++, CGI, Java, and Java Scripts. Further, the functions of some embodiments, when described as a series of steps for a method, could be implemented as a series of software instructions for being operated by a processor, such that the embodiments could be implemented as software, hardware, or a combination thereof.

As used herein, "sensor" relates to any device, component and/or system that can perform one or more of detecting, determining, assessing, monitoring, measuring, quantifying, and sensing something.

As used herein, "real-time" relates to a level of processing responsiveness that a user, module, or system senses as sufficiently immediate for a particular process or determination to be made, or that enables the processor to keep up with some external process.

As used herein, "user" relates to a consumer, machine entity, and/or requesting party, and may be human or machine.

In accordance with one or more embodiments set forth, illustrated, and described herein, a digital financial management platform is provided for a client device of a user having one or more financial accounts residing at one or more financial institution servers of a financial institution. The digital financial management platform includes a GUI for visual display and manipulation/engagement by the user on a UI of the client device. The GUI comprises one or more user-engageable use restriction input settings to enable entry of one or more use restriction input settings for one or more user-authorized financial payment instruments associated with the one or more financial accounts. The type of financial accounts associated with the digital financial management platform include, but is not limited to, any user financial account associated with a personal account and a commercial account. Example financial accounts may include, but is not limited to, checking accounts, savings accounts, etc.

Turning to the figures, in which FIG. 1 illustrates a communication environment that facilitates communications between a user and a financial institution. A client device 100 of a user (financial account holder) operating in the communication environment facilitates user access to and user management of one or more financial accounts residing at one or more financial institution servers 200 of the financial institution. The communication environment includes the client device 100, the one or more financial institution servers 200, and a communication network 300 through which communication is facilitated between the client device 100 and the one or more financial institution servers 200.

In accordance with one or more embodiments set forth, described, and/or illustrated herein, the client device 100 comprises a computing device, including but not limited to a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the client device 100 comprising any form of electronic device that optimizes or otherwise transforms the performance and functionality of the one or more embodiments in a manner that falls within the spirit and scope of the principles of this disclosure.

Figure 2:
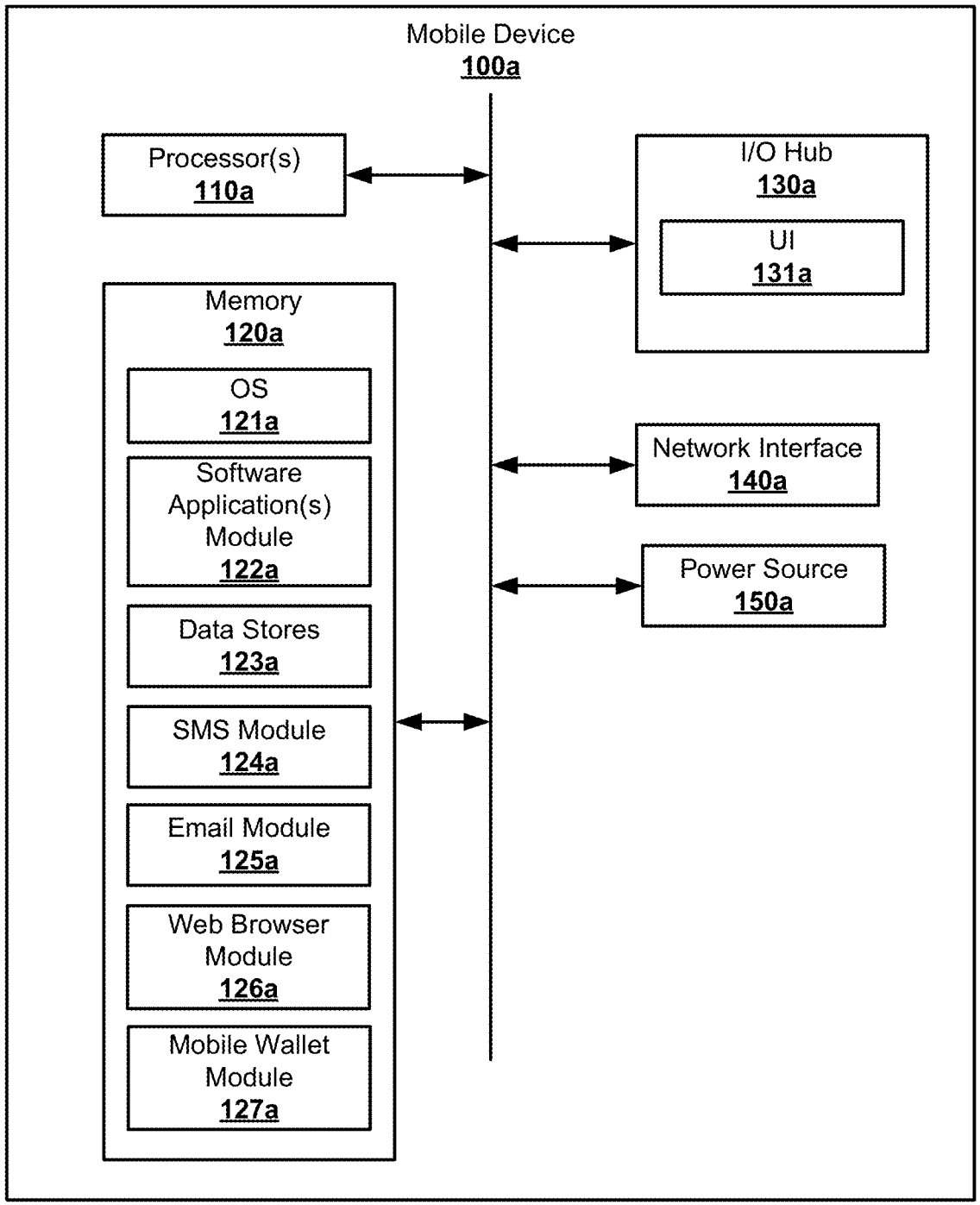
FIG. 2 illustrates a block diagram of the first client device of FIG. 1.

In the illustrated example embodiment of FIG. 2, the client device 100 comprises a mobile device 100a. Some of the possible operational elements of the mobile device 100a are illustrated in FIG. 2 and will now be described herein. It will be understood that it is not necessary for the mobile device 100a to have all the elements illustrated in FIG. 2. For example, the mobile device 100a may have any combination of the various elements illustrated in FIG. 2. Moreover, the mobile device 100a may have additional elements to those illustrated in FIG. 2.

The mobile device 100a includes one or more processors 110a, a non-transitory memory 120a operatively coupled to the one or more processors 110a, an I/O hub 130a, a network interface 140a, and a power source 150a.

The memory 120a comprises a set of instructions of computer-executable program code. The set of instructions are executable by the one or more processors 110a to cause execution of an operating system 121a and one or more software applications of a software application module 122a that reside in the memory 120a. The one or more software applications residing in the memory 120a includes, but is not limited to, a financial institution application that is associated with the financial institution. The financial institution application comprises mobile application software that facilitates establishment of a secure connection between the mobile device 100a and the one or more financial institution servers 200. The one or more processors 110a are operable to execute the mobile application to facilitate user access to the one or more financial accounts and user management of the one or more financial accounts.

The memory 120a also includes one or more data stores 123a that are operable to store one or more types of data. The mobile device 100a may include one or more interfaces that facilitate one or more systems or modules thereof to transform, manage, retrieve, modify, add, or delete, the data residing in the data stores 123a. The one or more data stores 123a may comprise volatile and/or non-volatile memory. Examples of suitable data stores 123a include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 123a may be a component of the one or more processors 110a or alternatively, may be operatively connected to the one or more processors 110a for use thereby. As set forth, described, and/or illustrated herein, "operatively connected" may include direct or indirect connections, including connections without direct physical contact.

The memory 120a also includes an SMS module 124a operable to facilitate user transmission and receipt of text messages via the mobile device 100a though the network 300. In one example embodiment, the user may receive text messages from the financial institution that are associated with the user access and the user management of the one or more financial accounts. An email module 125a is operable to facilitate user transmission and receipt of email messages via the mobile device 100a through the network 300. In one example embodiment, the user may receive email messages from the financial institution that are associated with the user access and the user management of the one or more financial accounts. The user may utilize a web browser module 126a that is operable to facilitate user access to one or more websites associated with the financial institution through the network 300. A digital wallet module 127a facilitates the generation of one or more digital wallets associated with the one or more financial accounts.

In accordance with one or more embodiments set forth, described, and/or illustrated herein, the mobile device 100a includes an I/O hub 130a operatively connected to other systems and subsystems of the mobile device 100a. The I/O system 130a may include one or more of an input interface, an output interface, and a network controller to facilitate communications between the mobile device 100a and the one or more financial institution servers 200. The input interface and the output interface may be integrated as a single, unitary user interface 131a, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 110a to execute instructions. The input interface may comprise a user interface (UI), a graphical user interface (GUI), such as, for example, a display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the mobile device 100a may serve as both a component of the input interface and a component of the output interface.

The mobile device 100a also includes a network interface 140a operable to facilitate connection to the network 300. The mobile device 100a further includes a power source 150a that comprises a wired powered source, a wireless power source, a replaceable battery source, or a rechargeable battery source.

Figure 3:
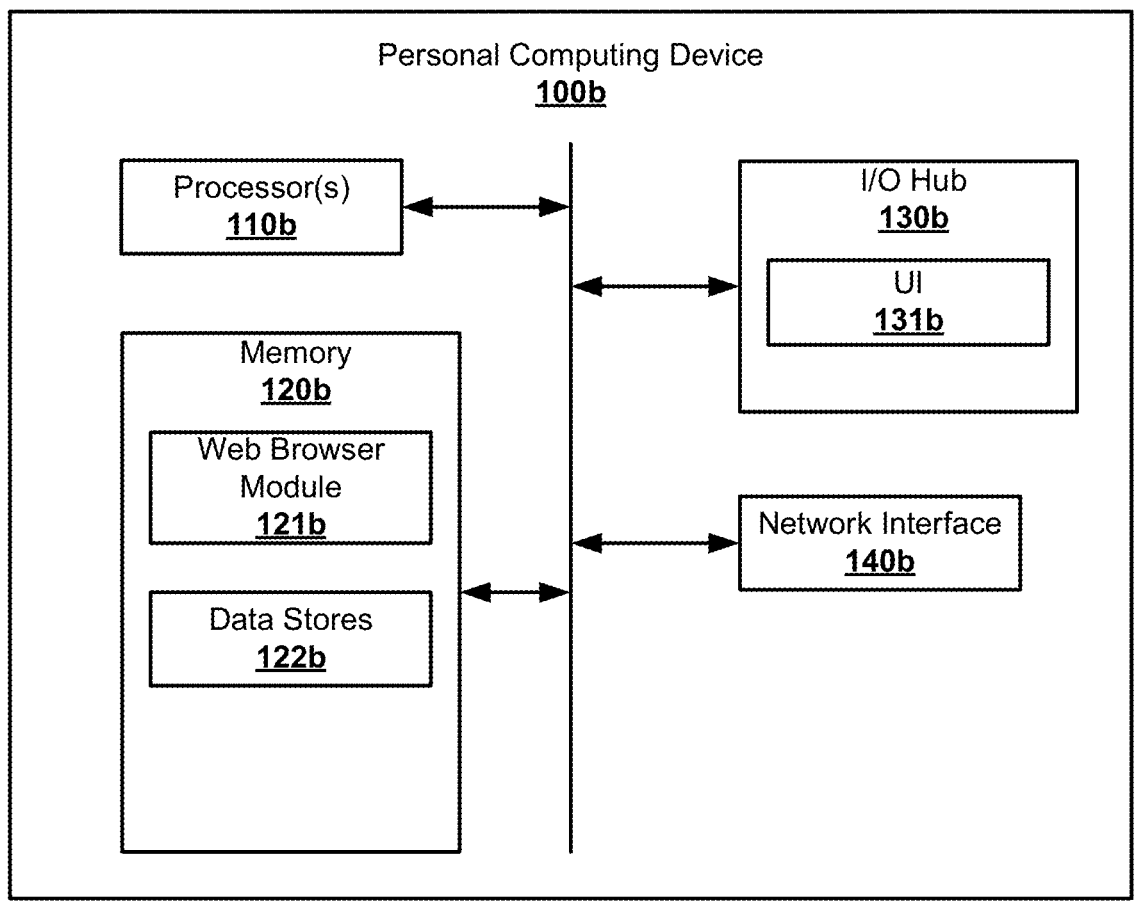
FIG. 3 illustrates a block diagram of the second client device of FIG. 1.

In the illustrated example embodiment of FIG. 3, the client device 100 comprises a personal computing device 100b. Some of the possible operational elements of the personal computing device 100b are illustrated in FIG. 3 and will now be described herein. It will be understood that it is not necessary for the personal computing device 100b to have all the elements illustrated in FIG. 3. For example, the personal computing device 100b may have any combination of the various elements illustrated in FIG. 3. Moreover, the personal computing device 100b may have additional elements to those illustrated in FIG. 3.

The personal computing device 100b includes one or more processors 110b, a non-transitory memory 120b operatively coupled to the one or more processors 110A, an I/O hub 130b, and a network interface 140b.

The memory 120b comprises a set of instructions of computer-executable program code. The set of instructions are executable by the one or more processors 110b to cause control of the web browser module 121b in a manner that facilitates user access to a web browser having one or more websites associated with the financial institution through the network 300.

The memory 120b also includes one or more data stores 122b that are operable to store one or more types of data. The personal computing device 100b may include one or more interfaces that facilitate one or more systems or modules thereof to transform, manage, retrieve, modify, add, or delete, the data residing in the data stores 122b. The one or more data stores 122b may comprise volatile and/or non-volatile memory. Examples of suitable data stores 122b include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 122b may be a component of the one or more processors 110b, or alternatively, may be operatively connected to the one or more processors 110b for use thereby. As set forth, described, and/or illustrated herein, "operatively connected" may include direct or indirect connections, including connections without direct physical contact.

In accordance with one or more embodiments set forth, described, and/or illustrated herein, "processor" means any component or group of components that are operable to execute any of the processes described herein or any form of instructions to carry out such processes or cause such processes to be performed. The one or more processors 100b may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 110b may comprise at least one hardware circuit (e.g., an integrated circuit) operable to carry out instructions contained in program code. In embodiments in which there is a plurality of processors, such processors may work independently from each other, or one or more processors may work in combination with each other.

In accordance with one or more embodiments set forth, described, and/or illustrated herein, the personal computing device 100a includes an I/O hub 130b operatively connected to other systems and subsystems of the personal computing device 100a. The I/O system 130b may include one or more of an input interface, an output interface, and a network controller to facilitate communications between the personal computing device 100a and the one or more financial institution servers 200. The input interface and the output interface may be integrated as a single, unitary user interface 131b, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 110b to execute instructions. The input interface may comprise a user interface (UI), a graphical user interface (GUI), such as, for example, a display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the mobile device 100a may serve as both a component of the input interface and a component of the output interface.

The personal computing device 100b also includes a network interface 140b operable to facilitate connection to the network 300.

Figure 4:
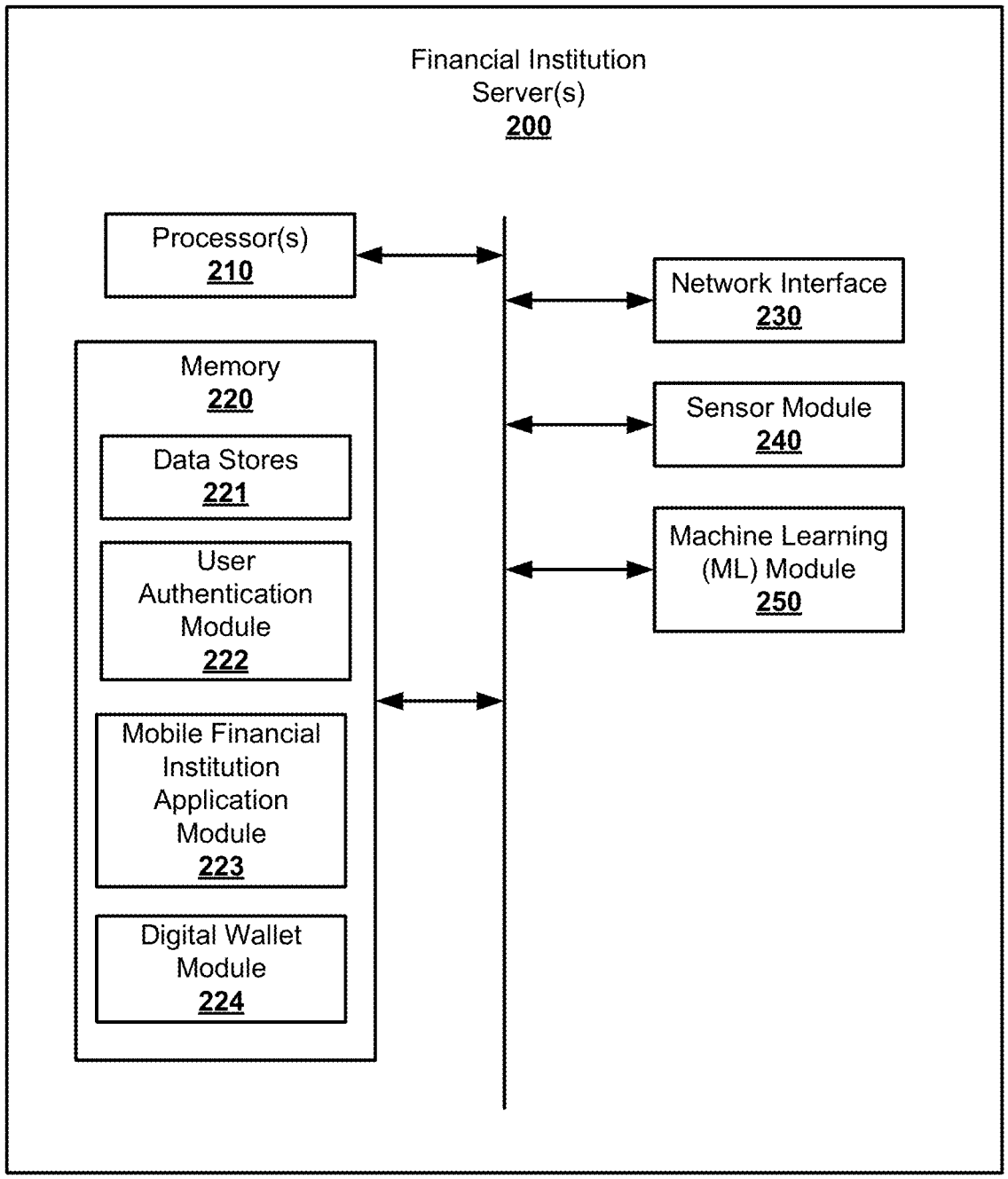
FIG. 4 illustrates a block diagram of the one or more financial institution servers of FIG. 1.

As illustrated in FIG. 4, the one or more financial institution servers 200 includes one or more processors 210, a non-transitory memory 220 operatively coupled to the one or more processors 210, a network interface 230, a sensor module 240, and a machine learning (ML) module 250. Some of the possible operational elements of each server in the one or more financial institution servers 200 are illustrated in FIG. 4 and will now be described herein. It will be understood that it is not necessary for each server in the one or more financial institution servers 200 to have all the elements illustrated in FIG. 4. For example, each server in the one or more financial institution servers 200 may have any combination of the various elements illustrated in FIG. 4. Moreover, each server in the one or more financial institution servers 200 may have additional elements to those illustrated in FIG. 4.

The one or more financial institution servers 200 may be controlled by a system manager (or policy manager) of the financial institution.

In accordance with one or more embodiments set forth, described, and/or illustrated herein, the one or more financial institution servers 200 may comprise a computing device, including but not limited to a server computer, a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the one or more financial institution servers 200 comprising any form of electronic device that optimizes or otherwise transforms the performance and functionality of the one or more embodiments in a manner that falls within the spirit and scope of the principles of this disclosure.

The memory 220 comprises a set of instructions of computer-executable program code. The set of instructions are executable by the one or more processors 210 in manner that facilitates control of a user authentication module 222, a mobile financial institution application module 223 having one or more mobile financial institution applications that reside in the memory 220, and a digital wallet module 224. In accordance with one or more embodiments set forth, described, and/or illustrated herein, the one or more financial institution servers 200 may individually or collectively execute the instructions to perform any one or more of the methodologies set forth, described, and illustrated herein.

The memory 220 also includes one or more data stores 221 that are operable to store one or more types of data, including but not limited to, user account data, user authentication data, sensor data, etc. The one or more data stores 221 may comprise volatile and/or non-volatile memory. Examples of suitable data stores 221 include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 221 may be a component of the one or more processors 210, or alternatively, may be operatively connected to the one or more processors 210 for use thereby. As set forth, described, and/or illustrated herein, "operatively connected" may include direct or indirect connections, including connections without direct physical contact.

The memory 220 may include a single machine-readable medium, or a plurality of media (e.g., a centralized or distributed database, or associated caches and servers) operable to store the instructions. The term "machine-readable medium" shall also be taken to include any medium, or combination of multiple media, that is capable of storing instructions (e.g., software) for execution by a server (e.g., server), such that the instructions, when executed by the one or more processors 210, cause the server(s) to perform any one or more of the methodologies set forth, described, and illustrated herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The computer-executable program code may instruct the one or more processors 210 to cause the user authentication module 221 to authenticate a user in order to gain user access to the one or more financial accounts. The user authentication module 221 may be caused to request user input user data or user identification that include, but are not limited to, user identity (e.g., username), a user passcode, a cookie, user biometric data, a private key, a token, and/or another suitable authentication data or information.

The computer-executable program code may instruct the one or more processors 210 to execute certain logic, data-processing, and data-storing functions of the one or more financial institution servers 200, in addition to certain communication functions of the one or more financial institution servers 200. The one or more mobile financial institution applications of the mobile financial institution application module 222 are operable to communicate with the first client device 100a and the second client device 100b in a manner which facilitates user access to the one or more financial accounts in addition to user management of the one or more financial accounts based on successful user authentication.

The sensor module 240 is operable, at least during execution of mobile application software or desktop application software by the client device 100, to dynamically detect, determine, assess, monitor, measure, quantify, and/or sense information about the client device 100. The sensor module 240 may be operable to detect, determine, assess, monitor, measure, quantify and/or sense in real-time. The sensor module 240 may be operable to detect, determine, assess, monitor, measure, quantify, and/or sense geographic location information about the geographic location of the client device 100.

The ML module 250 may include one or more ML algorithms to train one or more machine learning models of the one or more financial institution servers 200 based on data and/or information resided in the memory 220. The ML algorithms may include one or more of a linear regression algorithm, a logical regression algorithm, or a combination of different algorithms. A neural network may also be used to train the system based on the received data. The ML module 250 may analyze the received data and/or information, and transform the data and/or information in a manner which provides enhanced communication between the client device 100 and the one or more financial institution servers 200, while also enhancing user access and management of the one or more financial accounts. The data and/or information may also be up-linked to other systems and modules in the one or more financial institution servers 200 for further processing to discover additional information that may be used to enhance the understanding of the information.

In accordance with one or more embodiments set forth, described, and/or illustrated herein, the network 300 may comprise a wireless network, a wired network, or any suitable combination thereof. For example, the network 300 is operable to support connectivity using any protocol or technology, including, but not limited to wireless cellular, wireless broadband, wireless local area network (WLAN), wireless personal area network (WPAN), wireless short distance communication, Global System for Mobile Communication (GSM), or any other suitable wired or wireless network operable to transmit and receive a data signal.

In accordance with one or more embodiments set forth, described, and/or illustrated herein, a user may, via the client device 100, execute mobile application software or desktop application software associated with the financial institution over the communication network 300. Upon being authenticated by the user authentication module 221, the user may transmit via the client device 100, a service request or query to the one or more financial institution server(s) 200 for one or more financial services that are offered by the financial institution. Such financial services may include, but are not limited to, a temporary spend limit program offered by the financial institution that is associated with one or more financial payment instruments for use by a user having one or more financial accounts that reside in the one or more financial institution servers 200.

Figure 5:
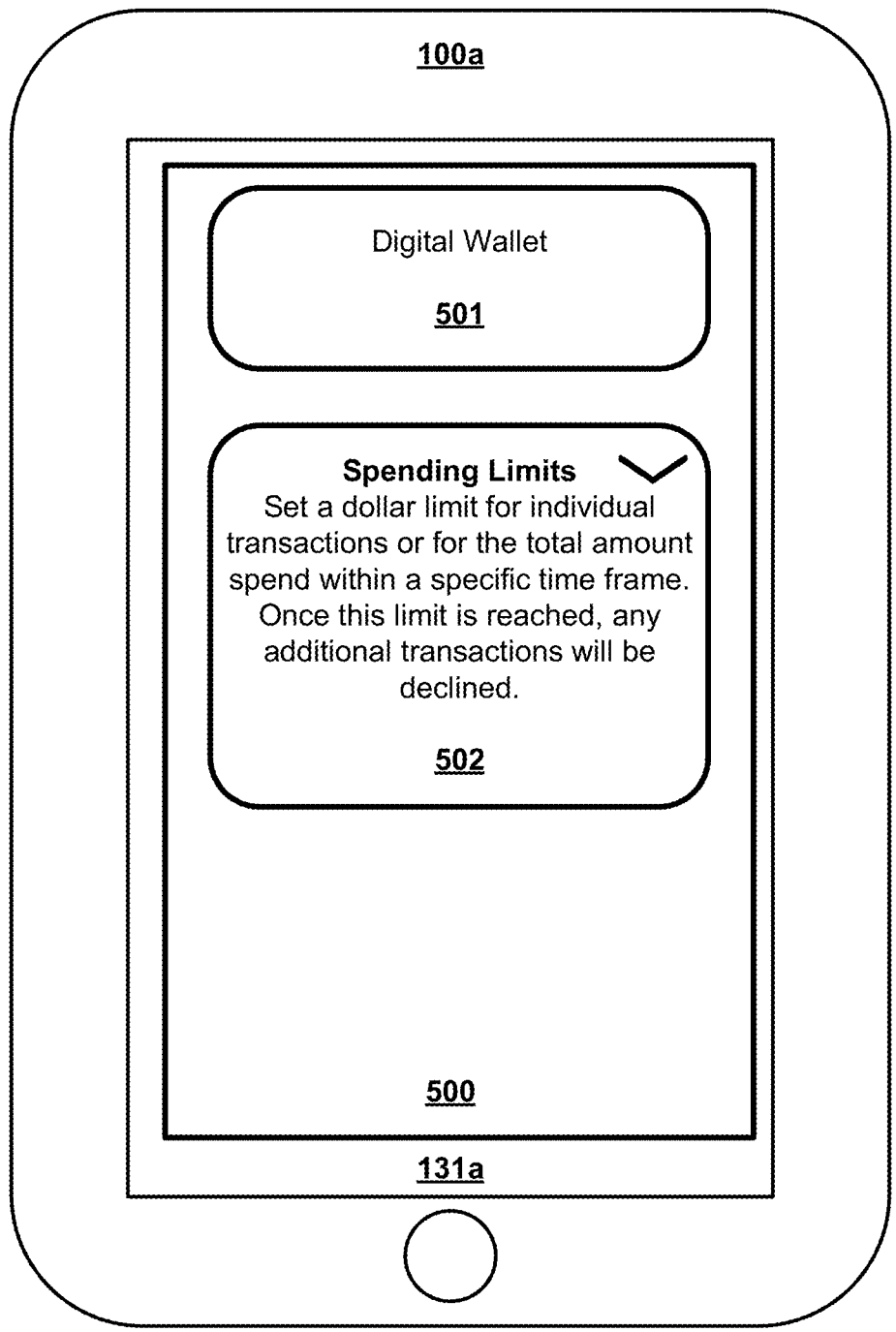

As illustrated in FIG. 5, the computer-executable program code may instruct the one or more processors 210 to cause (e.g., via the mobile financial institution application module 223 and/or the digital wallet module 224), over the communication network 300 via a software application associated with the financial institution ("financial institution software application"), the display, generation, or rendering of a GUI comprising a dashboard 500 for visual display on the user interface 131a of the mobile device 100a. The dashboard 500 comprises a graphical object that comprises a digital representation of a user-authorized financial payment instrument, e.g., a digital wallet 501, associated with one or more financial accounts maintained at the financial institution and which reside in the one or more financial institution servers 200. The dashboard 500 also comprises a user-engageable tile 502 associated with a spending limit associated with the user-authorized financial payment instrument. The spending limit enables a user, via the client device 100, to set one or more use restrictions on the user-authorized financial payment instrument.

Figure 6:
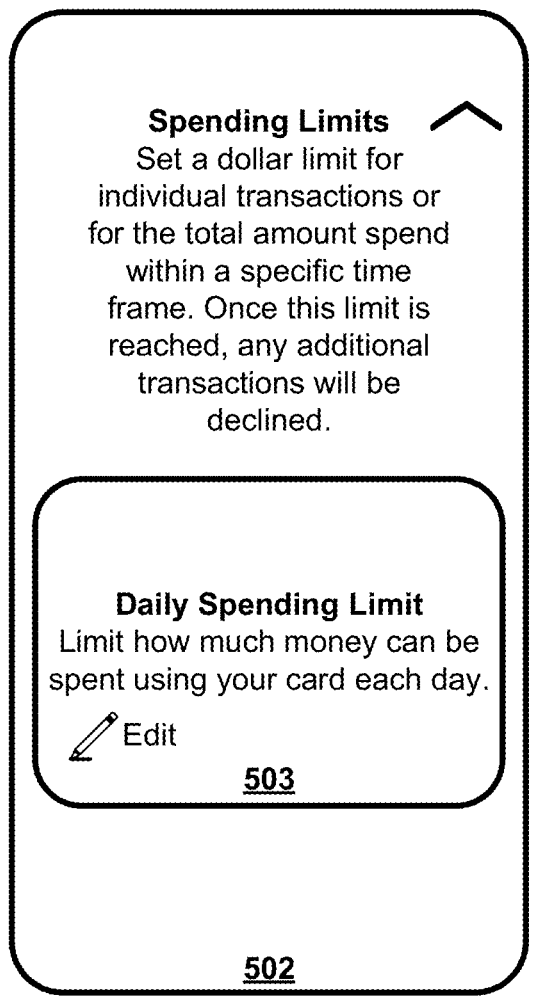

As illustrated in FIG. 6, the computer-executable program code may instruct the one or more processors 210 to cause, in response to a user engaging or otherwise manipulating the user-engageable tile 502, modification of the user-engageable tile 502 by causing the display of a user-engageable tile 503 on the user-engageable tile 502. The user-engageable tile 503 enables the user to enter and/or edit, via the client device 100, a predetermined spend limit monetary amount as an input setting.

Figure 7:
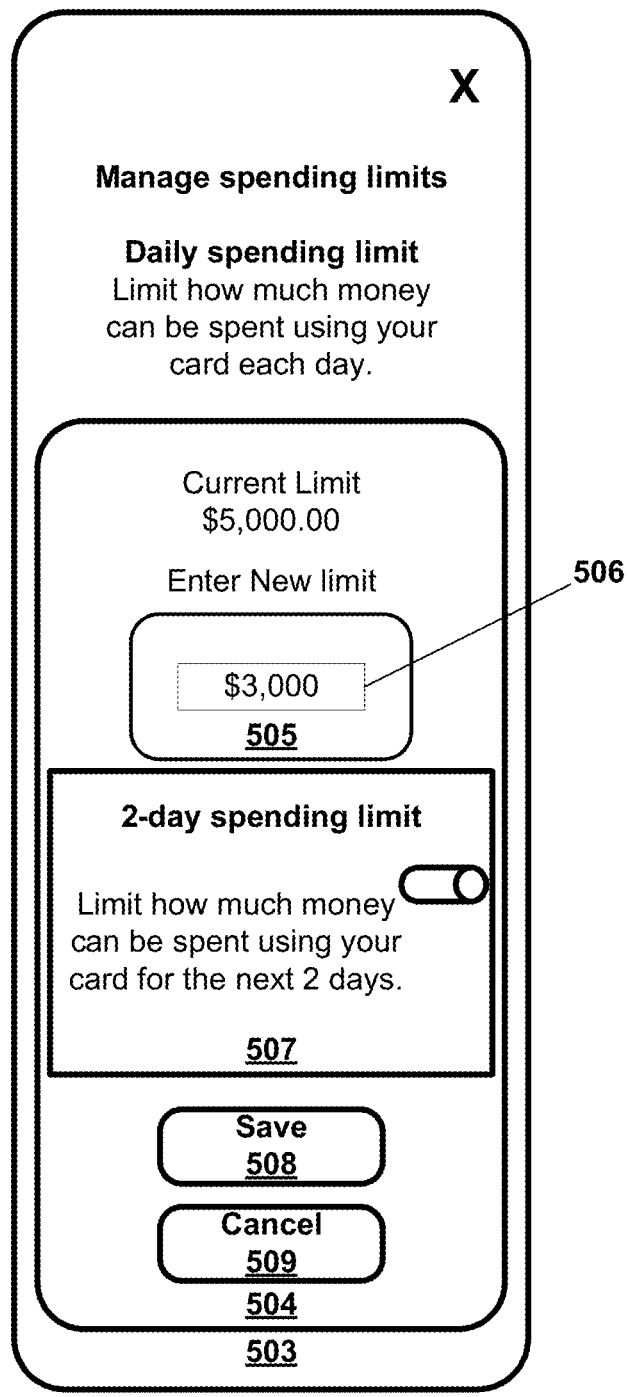

As illustrated in FIG. 7, the computer-executable program code may instruct the one or more processors 210 to cause, in response to a user engaging or otherwise manipulating the user-engageable tile 503, modification of the user-engageable tile 503 by causing the display of a user-engageable tile 504 on the user-engageable tile 503.

The user-engageable tile 504 enables a user to manage the one or more use restrictions on the user-authorized financial payment instrument. The user-engageable tile 504 includes a user-engageable tile 505 that includes a tile 505 having an input box 506 that enables the user to enter predetermined spend limit input setting for a specific monetary amount. The user-engageable tile 504 also includes a user-engageable icon 508 to enable the user to save the predetermined spend limit input setting in the memory 220, and a user-engageable icon 509 to enable the user to cancel the predetermined spend limit input setting.

In accordance with one or more embodiments set forth, described, and/or illustrated herein, the predetermined spend limit input setting has a predetermined maximum spend limit that is based on a current user status level among a plurality of user status levels associated with the one or more financial accounts. Each user status level in the plurality of user status levels is based on the accumulated overall financial assets of the one or more financial accounts. Thus, the predetermined maximum spend limit that corresponds to the current user status level of the user. Meaning, the higher the status level, the greater the predetermined maximum spend limit.

In the illustrated embodiment of FIG. 7, the predetermined spend limit input setting is associated with a predetermined time limit (e.g., two days) that is automatically derived by the financial institution. The user-engageable tile 504 also includes an icon 507 having a user-engageable toggle switch to selectively enable or disable the predetermined time limit by the user.

Figure 8:
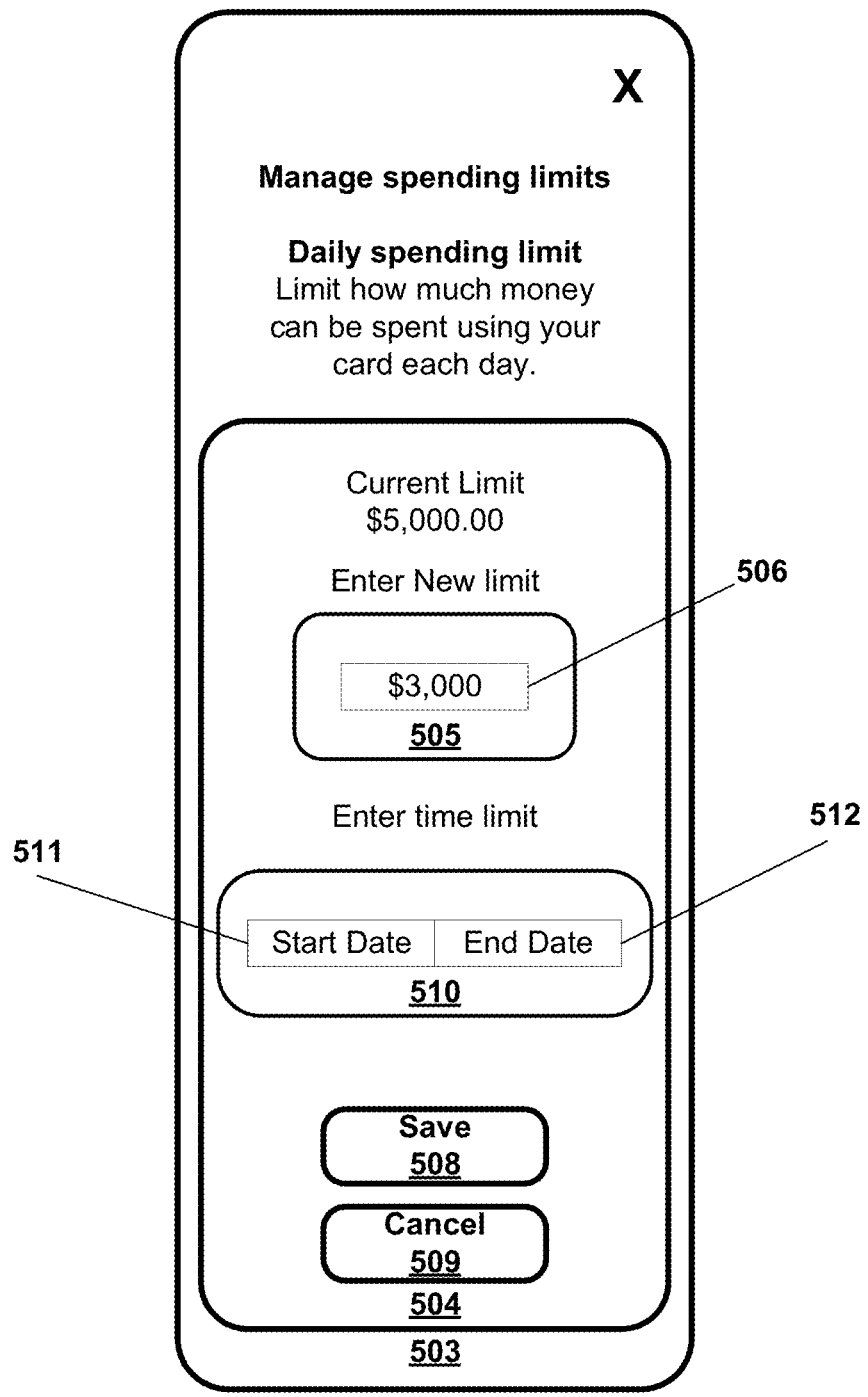

In the illustrated embodiment of FIG. 8, the predetermined spend limit input setting is associated with a predetermined time limit that is selectively chose by a user via tile 510. The tile 510 includes an input box 511 that enables the user to enter a start date to commence the predetermined spend limit and an input box 512 that enables the user to enter an end date to end the predetermined spend limit.

In accordance with one or more embodiments set forth, described, and/or illustrated herein, the computer-executable program code may instruct the one or more processors 210 to return the predetermined spend limit to a default status in response to an expiration of the predetermined end date.

Figure 9:
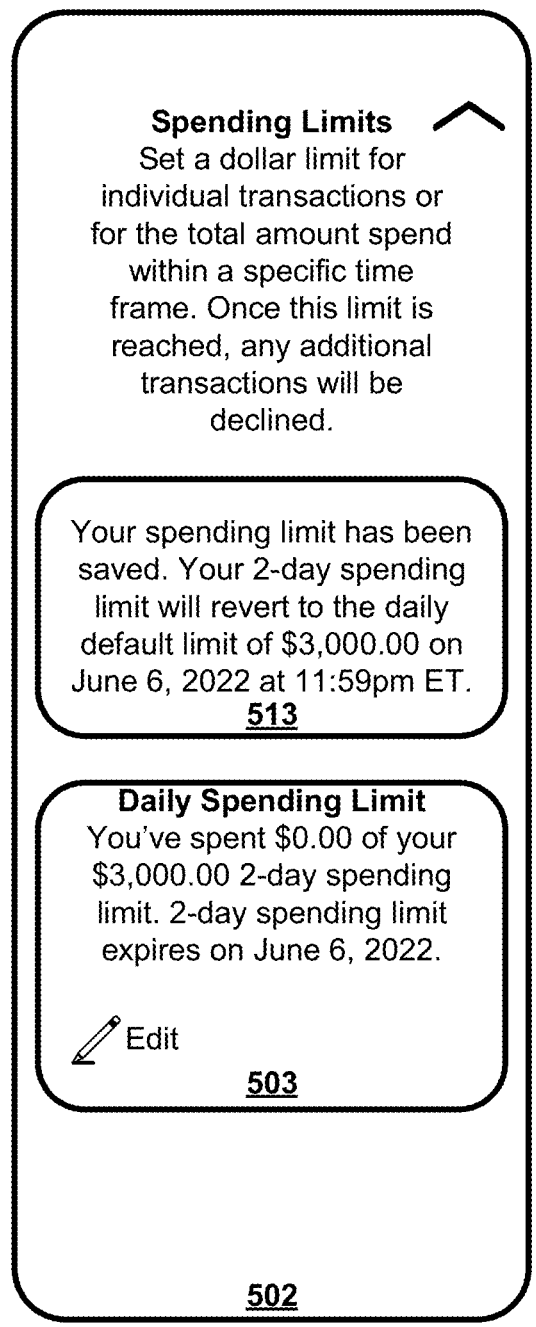

As illustrated in FIG. 9, the computer-executable program code may instruct the one or more processors 210 to cause, in response to the user saving the one or more use restrictions in memory 220, display of a tile 513 on the tile 502. The tile 513 represents a visual alert to inform the user that the one or more use restrictions are saved and the spend limit will expire on a specific expiration date.

Figure 10:
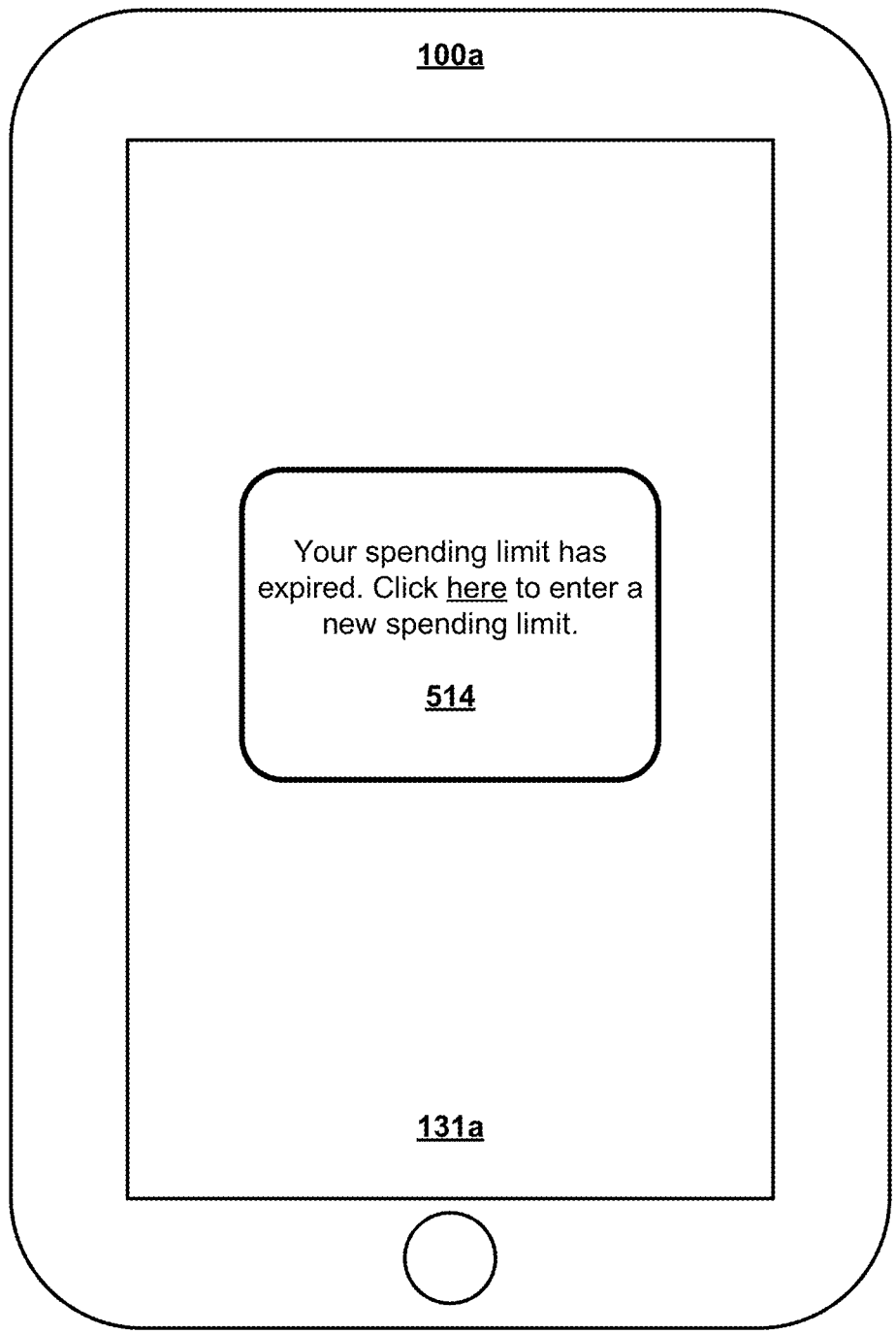

As illustrated in FIG. 10, the computer-executable program code may instruct the one or more processors 210 to transmit, in response to the expiration of the predetermined end date, an electronic notification 515 (e.g., an email, text, pop-up notification, etc.) to the client device that visually displays an indication that the predetermined end date has expired. The electronic notification may include a user-engageable link that, when engaged by the user, causes the display of the dashboard 500 on the user interface 131*a* of the mobile device 100*a* to enable the user to set one or more use restrictions on the user-authorized financial payment instrument.

In accordance with one or more embodiments set forth, described, and/or illustrated herein, the computer-executable program code may instruct the one or more processors 210 to detect a financial transaction by the user-authorized financial payment instrument for a monetary amount.

In accordance with one or more embodiments set forth, described, and/or illustrated herein, the computer-executable program code may instruct the one or more processors 210 to execute, in response to the detection, financial transaction analysis based on stored user account settings data associated with the one or more user-engageable use restriction input settings.

In accordance with one or more embodiments set forth, described, and/or illustrated herein, the computer-executable program code may instruct the one or more processors 210 to execute the financial transaction analysis by determining whether the monetary amount of the financial transaction is greater than the predetermined spend limit.

In accordance with one or more embodiments set forth, described, and/or illustrated herein, the computer-executable program code may instruct the one or more processors 210 to execute the financial transaction analysis by conducting a comparison between the monetary amount and the predetermined spend limit.

In accordance with one or more embodiments set forth, described, and/or illustrated herein, the computer-executable program code may instruct the one or more processors 210 to transmit an electronic signal to a merchant server declining the financial transaction when the monetary amount is greater than the predetermined spend limit.

Figure 11:
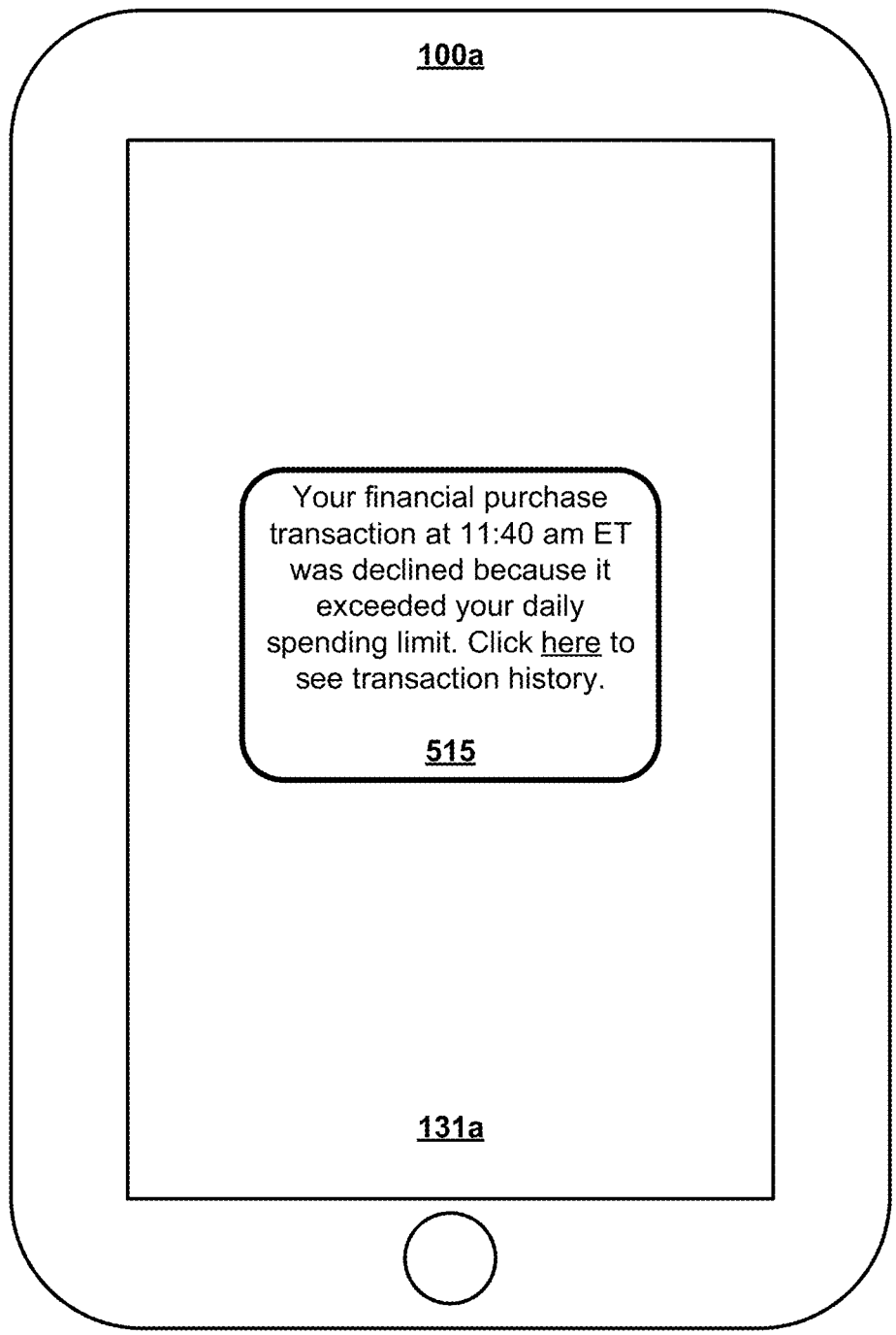

As illustrated in FIG. 11, the computer-executable program code may instruct the one or more processors 210 to transmit, in response to the expiration of the predetermined end date, an electronic notification 515 to the client device that visually displays an indication that the financial transaction was declined. The electronic notification (e.g., an email, text, pop-up notification, etc.) that indicates whether the request was approved or denied.

Illustrated examples shown in FIGS. 12 to 15 set forth computer-implemented methods 1200, 1300, 1400, and 1500. In one or more examples, the respective flowcharts of the computer-implemented methods 1200, 1300, 1400, and 1500 may be implemented by the one or more processors 210 of the one or more financial institution servers 200. In particular, the computer-implemented methods 1200, 1300, 1400, and 1500 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

In accordance with one or more embodiments set forth, described, and/or illustrated herein, software executed by the one or more financial institution servers 200 provides functionality described or illustrated herein. In particular, software executed by the one or more processors 210 is operable to perform one or more processing blocks of the computer-implemented methods 1200, 1300, 1400, and 1500 set forth, described, and/or illustrated herein, or provides functionality set forth, described, and/or illustrated.

Figure 12:
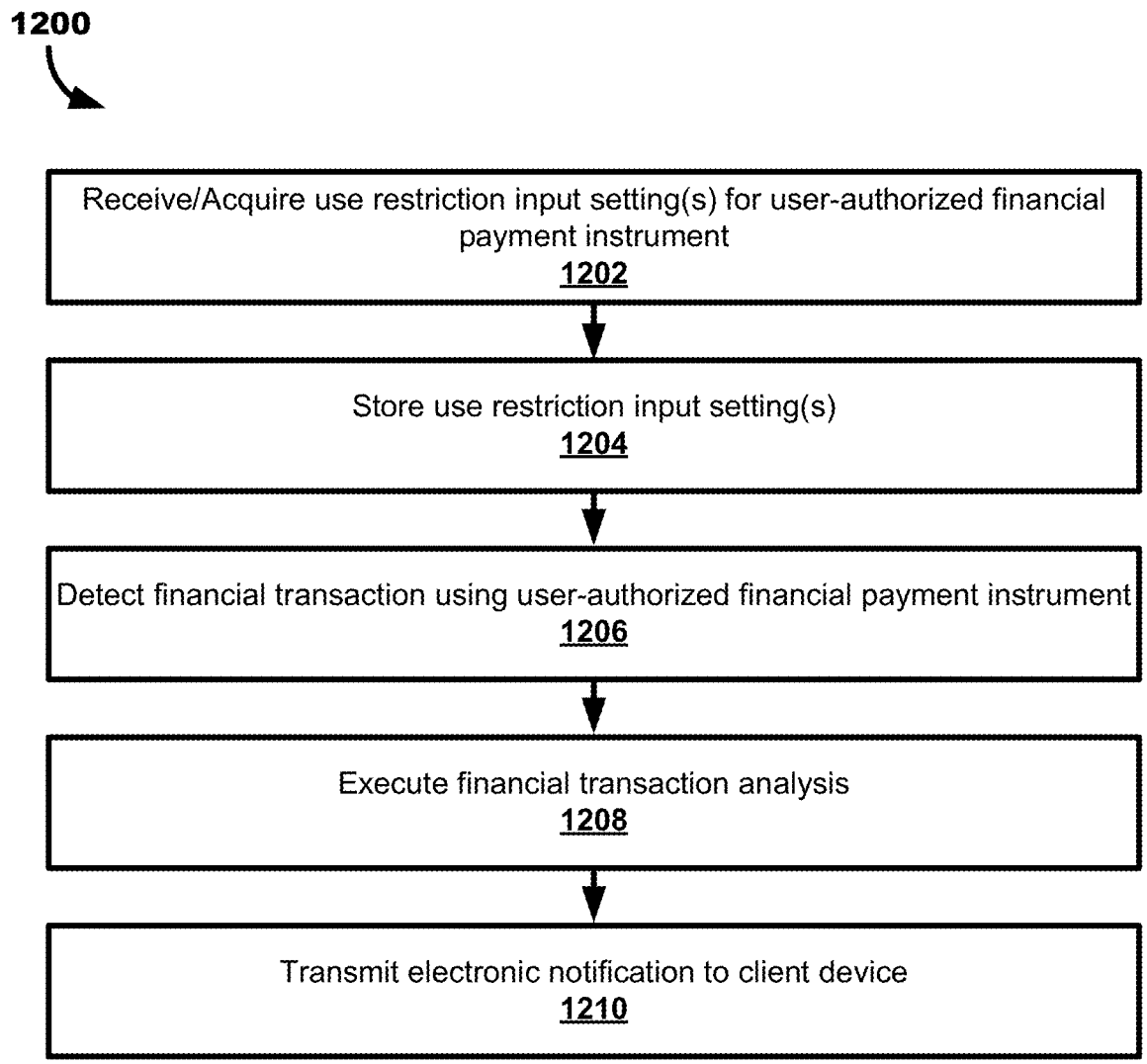

As illustrated in FIG. 12, illustrated process block 1202 includes receiving, by one or more financial institution servers associated with a financial institution and from a client device of a user having one or more primary financial accounts at the financial institution, one or more use restrictions on a user-authorized financial payment instrument associated with the one or more financial accounts.

In accordance with process block 1202, the one or more user-engageable use restriction input settings comprises a predetermined spend limit input setting having a predetermined maximum spend limit that is based on a current user status level among a plurality of user status levels associated with the one or more financial accounts.

In accordance with process block 1202, the user-authorized financial payment instrument comprises one or more of a physical debit card, virtual debit card, and digital wallet.

In accordance with process block 1202, each user status level in the plurality of user status levels is based on the accumulated overall financial assets of the one or more financial accounts.

In accordance with process block 1202, the one or more user-engageable use restriction input settings further comprises a predetermined time limit input setting associated with the predetermined spend limit.

In accordance with process block 1202, the predetermined time limit input setting comprises a predetermined start date input setting and a predetermined end date input setting.

The computer-implemented method 1200 may then proceed to illustrated process block 1204, which includes storing, by the one or more financial institution servers, the use restriction input settings in non-transitory memory of the one or more financial institution servers.

The computer-implemented method 1200 may then proceed to illustrated process block 1206, which includes detecting, by the one or more financial institution servers, a financial transaction by the user-authorized financial payment instrument.

The computer-implemented method 1200 may then proceed to illustrated process block 1208, which includes executing, by the one or more financial institution servers in response to the detection, financial transaction analysis based on stored user account settings data associated with the use restriction input settings.

In accordance with process block 1208, executing the financial transaction analysis comprises conducting a comparison between the monetary amount and the predetermined spend limit.

The computer-implemented method 1200 may then proceed to illustrated process block 1210, which includes transmitting, by the one or more financial institution servers based on the financial transaction analysis, an electronic notification to the client device that includes a user-engageable link that, when engaged by the user, facilitates viewing of a transaction history of the financial transaction.

In accordance with process block 1210, transmitting the electronic notification comprises causing the visually display of an indication that the financial transaction was declined.

In accordance with process block 1210, transmitting the electronic notification comprises causing the visually display of an indication that the predetermined end date has expired.

The computer-implemented method 1200 may terminate or end after execution of process block 1210.

As illustrated in FIG. 13, illustrated process block 1302 includes causing, by one or more financial institution servers associated with a financial institution and from a client device of a user having one or more primary financial accounts at the financial institution, visual display of a graphical user interface (GUI) on a user interface (UI) of the client device, the GUI comprising one or more user-engageable use restriction input settings to facilitate a placement of one or more use restrictions on a user-authorized financial payment instrument associated with the one or more financial accounts, the one or more user-engageable use restriction input settings comprising a predetermined spend limit input setting having a predetermined maximum spend limit that is based on a current user status level among a plurality of user status levels associated with the one or more financial accounts.

In accordance with process block 1302, each user status level in the plurality of user status levels is based on the accumulated overall financial assets of the one or more financial accounts.

In accordance with process block 1302, the user-authorized financial payment instrument comprises one or more of a physical debit card, virtual debit card, and digital wallet.

In accordance with process block 1302, the one or more user-engageable use restriction input settings further comprises a predetermined time limit input setting associated with the predetermined spend limit.

In accordance with process block 1302, the predetermined time limit input setting comprises a predetermined start date input setting and a predetermined end date input setting.

The computer-implemented method 1300 may then proceed to illustrated process block 1304, which includes receiving, by the one or more financial institution servers and from the client device, one or more use restrictions on the user-authorized financial payment instrument.

The computer-implemented method 1300 may then proceed to illustrated process block 1306, which includes detecting, by the one or more financial institution servers, a financial transaction by the user-authorized financial payment instrument.

The computer-implemented method 1300 may then proceed to illustrated process block 1308, which includes executing, by the one or more financial institution servers in response to the detection, financial transaction analysis based on stored user account settings data associated with the use restriction input settings.

In accordance with process block 1308, executing the financial transaction analysis comprises conducting a comparison between the monetary amount and the predetermined spend limit.

The computer-implemented method 1300 may then proceed to illustrated process block 1310, which includes transmitting, by the one or more financial institution servers based on the financial transaction analysis, an electronic notification to the client device that includes a user-engageable link that, when engaged by the user, facilitates viewing of a transaction history of the financial transaction.

In accordance with process block 1310, transmitting the electronic notification comprises causing the visually display of an indication that the financial transaction was declined.

In accordance with process block 1310, transmitting the electronic notification comprises causing the visually display of an indication that the predetermined end date has expired.

The computer-implemented method 1300 may terminate or end after execution of process block 1310.

As illustrated in FIG. 14, illustrated process block 1402 includes causing, by one or more financial institution servers associated with a financial institution and from a client device of a user having one or more primary financial accounts at the financial institution, visual display of a graphical user interface (GUI) on a user interface (UI) of the client device, the GUI comprising one or more user-engageable use restriction input settings to facilitate a placement of one or more use restrictions on a user-authorized financial payment instrument associated with the one or more financial accounts, the one or more user-engageable use restriction input settings comprising a predetermined spend limit input setting having a predetermined maximum spend limit that is based on a current user status level among a plurality of user status levels associated with the one or more financial accounts.

In accordance with process block 1402, each user status level in the plurality of user status levels is based on the accumulated overall financial assets of the one or more financial accounts.

In accordance with process block 1402, the user-authorized financial payment instrument comprises one or more of a physical debit card, virtual debit card, and digital wallet.

In accordance with process block 1402, the one or more user-engageable use restriction input settings further comprises a predetermined time limit input setting associated with the predetermined spend limit.

In accordance with process block 1402, the predetermined time limit input setting comprises a predetermined start date input setting and a predetermined end date input setting.

The computer-implemented method 1400 may then proceed to illustrated process block 1404, which includes receiving, by the one or more financial institution servers and from the client device, one or more use restrictions on the user-authorized financial payment instrument.

The computer-implemented method 1400 may then proceed to illustrated process block 1406, which includes detecting, by the one or more financial institution servers, a financial transaction by the user-authorized financial payment instrument.

The computer-implemented method 1400 may terminate or end after execution of process block 1406.

Figure 15:
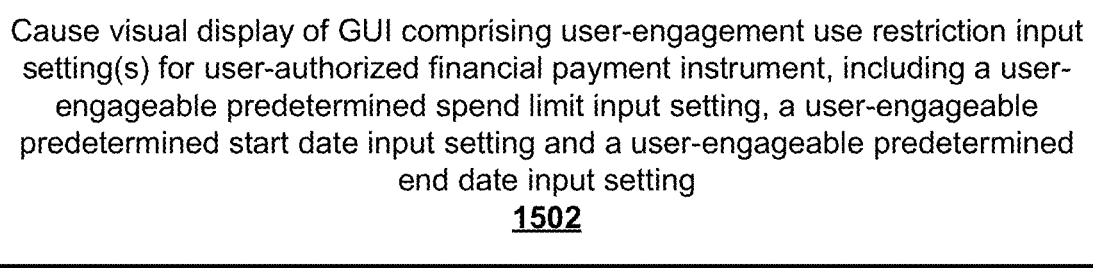

As illustrated in FIG. 15, illustrated process block 1502 includes causing, by one or more financial institution servers associated with a financial institution and from a client device of a user having one or more primary financial accounts at the financial institution, visual display of a graphical user interface (GUI) on a user interface (UI) of the client device, the GUI comprising one or more user-engageable use restriction input settings to facilitate a placement of one or more use restrictions on a user-authorized financial payment instrument associated with the one or more financial accounts, the one or more user-engageable use restriction input settings comprising a predetermined spend limit input setting having a predetermined maximum spend limit that is based on a current user status level among a plurality of user status levels associated with the one or more financial accounts.

In accordance with process block 1502, each user status level in the plurality of user status levels is based on the accumulated overall financial assets of the one or more financial accounts.

In accordance with process block 1502, the user-authorized financial payment instrument comprises one or more of a physical debit card, virtual debit card, and digital wallet.

In accordance with process block 1502, the one or more user-engageable use restriction input settings further comprises a predetermined time limit input setting associated with the predetermined spend limit.

In accordance with process block 1502, the predetermined time limit input setting comprises a predetermined start date input setting and a predetermined end date input setting.

The computer-implemented method 1500 may terminate or end after execution of process block 1502.

In accordance with one or more embodiments set forth, described, and/or illustrated herein, the first client device 100*a*, the second client device 100*b*, and the one or more financial institution server(s) 200 could function in a fully virtualized environment. A virtual machine is where all hardware is virtual and operation is run over a virtual processor. The benefits of computer virtualization have been recognized as greatly increasing the computational efficiency and flexibility of a computing hardware platform. For example, computer virtualization facilitates multiple virtual computing machines to execute on a common computing hardware platform. Similar to a physical computing hardware platform, virtual computing machines include storage media, such as virtual hard disks, virtual processors, and other system components associated with a computing environment. For example, a virtual hard disk can store the operating system, data, and application files for a virtual machine. Virtualized computer system includes computing device or physical hardware platform, virtualization software running on hardware platform, and one or more virtual machines running on hardware platform by way of virtualization software. Virtualization software is therefore logically interposed between the physical hardware of hardware platform and guest system software running "in" virtual machine.

Memory of the hardware platform may store virtualization software and guest system software running in virtual machine. Virtualization software performs system resource management and virtual machine emulation. Virtual machine emulation may be performed by a virtual machine monitor (VMM) component. In typical implementations, each virtual machine (only one shown) has a corresponding VMM instance. Depending on implementation, virtualization software may be unhosted or hosted. Unhosted virtualization software generally relies on a specialized virtualization kernel for managing system resources, whereas hosted virtualization software relies on a commodity operating system: the "host operating system," such as Windows or Linux to manage system resources. In a hosted virtualization system, the host operating system may be considered as part of virtualization software.

The system and method described herein may be at least partially processor-implemented, the one or more processors 210 being an example of hardware. For example, at least some of the operations of the computer-implemented methods may be performed by the one or more processors 210 or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors 210, not only residing within a single machine, but deployed across a plurality of machines. In some example embodiments, the one or more processors 210 or processor-implemented modules may be located in a single geographic location (e.g., within a home environment, an office environment, or a server farm). In other example embodiments, the one or more processors or processor-implemented modules may be distributed across a plurality of geographic locations.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, devices that are in communication with or coupled with each other may communicate directly or indirectly through one or more intermediaries.

The terms "coupled," "attached," or "connected" may be used herein to refer to any type of relationship, direct or indirect, between the components in question, and may apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A server computing system, comprising:
    one or more processors; and
    a non-transitory memory coupled to the one or more processors, the non-transitory memory including a digital wallet hardware module and a set of instructions of computer-executable program code, which when executed by the one or more processors, cause the server computing system to:
        receive, from an authenticated client device executing financial institution application software, a service request to participate in a temporary spend limit program for a user-authorized financial payment instrument comprising a digital wallet associated with a user financial account,
        cause, via the digital wallet hardware module in response to receipt of the service request, a visual display of a graphical user interface (GUI) on a user interface of the client device, the GUI comprising a digital representation of the digital wallet and one or more user-engageable use restriction input settings to facilitate entry of one or more use restrictions on the digital wallet, the one or more user-engageable use restriction input settings comprising a predetermined spend limit input setting associated with a predetermined time limit input setting, the predetermined spend limit setting having a predetermined maximum spend limit based on a current user status level among a plurality of user status levels associated with the user financial accounts, the GUI having a user-engageable toggle switch to selectively enable or disable the predetermined time limit,
        receive, from the client device, account settings data associated with the one or more use restrictions input settings for the digital wallet,
        execute, in response to expiration of the predetermined end date, a return of the predetermined spend limit to a default spend limit, and
        transmit, to the client device via the digital wallet hardware module in response to the expiration of the predetermined end date, an electronic notification including a user-engageable link that causes a visual display of the GUI dashboard on the user interface to enable the user to set one or more new use restrictions on the digital wallet.

2. The server computing system of claim 1, wherein the set of instructions, which when executed by the one or more processors, cause the server computing system to store the account settings data in the non-transitory memory.

3. The server computing system of claim 2, wherein the set of instructions, which when executed by the one or more processors, cause the server computing system to:
    detect a financial transaction having a monetary amount that is paid via the digital wallet; and
    execute, in response to the detection, financial transaction analysis based on the stored account settings data associated with the use restriction input settings, the financial transaction analysis comprising conducting a comparison between the monetary amount and the predetermined spend limit.

4. The server computing system of claim 3, further comprising a machine learning (ML) module including one or more ML algorithms operable to train one or more machine learning models based on the based on the financial transaction analysis, the user authentication data, and the account settings data residing in non-transitory memory of the server computing system.

5. The server computing system of claim 3, wherein the set of instructions, which when executed by the one or more processors, cause the server computing system to transmit, to the client device in response to the financial transaction analysis, an electronic notification to the client device that includes a user-engageable link that enables viewing of a transaction history of the financial transaction.

6. A computer program product comprising at least one non-transitory computer readable medium having with a set of instructions of computer-executable program code, which when executed by one or more processors of a server computing system, cause the server computing system to:
    receive, from an authenticated client device executing financial institution application software, a service request to participate in a temporary spend limit program for a user-authorized financial payment instrument comprising a digital wallet associated with a user financial account;
    cause, via a digital wallet hardware module in response to receipt of the service request, a visual display of a graphical user interface (GUI) on a user interface of the client device, the GUI comprising a digital representation of the digital wallet and one or more user-engageable use restriction input settings to facilitate entry of one or more use restrictions on the digital wallet, the one or more user-engageable use restriction input settings comprising a predetermined spend limit input setting associated with a predetermined time limit input setting, the predetermined spend limit setting having a predetermined maximum spend limit based on a current user status level among a plurality of user status levels associated with the financial account, the GUI having a user-engageable toggle switch to selectively enable or disable the predetermined time limit;
    receive, from the client device, account settings data associated with the one or more use restrictions input settings for the digital wallet;
    execute, in response to expiration of the predetermined end date, a return of the predetermined spend limit to a default spend limit; and transmit, to the client device via the digital wallet hardware module in response to the expiration of the predetermined end date, an electronic notification including a user-engageable link that causes a visual display of the GUI dashboard on the user interface to enable the user to set one or more new use restrictions on the digital wallet.

7. The computer program product of claim 6, wherein the set of instructions, which when executed by the one or more processors, cause the server computing system to store the account settings data in the non-transitory memory.

8. The computer program product of claim 7, wherein the set of instructions, which when executed by the one or more processors, cause the server computing system to:
   detect a financial transaction having a monetary amount that is paid via the digital wallet; and
   execute, in response to the detection, financial transaction analysis based on the stored account settings data associated with the use restriction input settings, the financial transaction analysis comprising conducting a comparison between the monetary amount and the predetermined spend limit.

9. The computer program product of claim 8, wherein the set of instructions, which when executed by the one or more processors, cause the server computing system to train, via a machine learning (ML) module including one or more ML algorithms, one or more machine learning models based on the based on the financial transaction analysis, user authentication data, and the account settings data residing in non-transitory memory of the server computing system.

10. The computer program product of claim 8, wherein the set of instructions, which when executed by the one or more processors, cause the server computing system to transmit, to the client device in response to the financial transaction analysis, an electronic notification to the client device that includes a user-engageable link that enables viewing of a transaction history of the financial transaction.

11. A computer-implemented method, comprising:
   authenticating, by a server computing system via a user authentication hardware module based on receipt of user authentication data, a client device of a user during execution of financial institution application software by the client device;
   receiving, by the server computing system from the client device in response to authenticating the client device, a service request to participate in a temporary spend limit program for a user-authorized financial payment instrument comprising a digital wallet associated with a user financial account;
   causing, by the server computing system via a digital wallet hardware module in response to receipt of the service request, a visual display of a graphical user interface (GUI) on a user interface of the client device, the GUI comprising a digital representation of the digital wallet and one or more user-engageable use restriction input settings to facilitate entry of one or more use restrictions on a user-authorized financial payment instrument associated with the digital wallet, the one or more user-engageable use restriction input settings comprising a predetermined spend limit input setting associated with a predetermined time limit input setting, the predetermined spend limit setting having a predetermined maximum spend limit based on a current user status level among a plurality of user status levels associated with the financial account, the GUI having a user-engageable toggle switch to selectively enable or disable the predetermined time limit;
   receiving, from the client device by the server computing system, account settings data associated with the one or more use restrictions input settings for the digital wallet;
   executing, by the server computing system in response to expiration of the predetermined end date, a return of the predetermined spend limit to a default spend limit; and
   transmitting, by the server computing system to the client device via the digital wallet hardware module in response to the expiration of the predetermined end date, an electronic notification including a user-engageable link that causes a visual display of the GUI dashboard on the user interface to enable the user to set one or more new use restrictions on the digital wallet.

12. The computer-implemented method of claim 11, further comprising storing, by the server computing system, the account settings data in non-transitory memory of the server computing system.

13. The computer-implemented method of claim 12, further comprising:
   detecting, by the server computing system, a financial transaction having a monetary amount that is paid via the digital wallet; and
   executing, by the server computing system in response to the detection, financial transaction analysis based on the stored account settings data associated with the use restriction input settings, the financial transaction analysis comprising conducting a comparison between the monetary amount and the predetermined spend limit.

14. The computer-implemented method of claim 13, further comprising training, by the server computing system via a machine learning (ML) module including one or more ML algorithms, one or more machine learning models based on the based on the financial transaction analysis, user authentication data, and the account settings data residing in non-transitory memory of the server computing system.

15. The computer-implemented method of claim 13, further comprising transmitting, to the client device by the server computing system in response to the financial transaction analysis, an electronic notification to the client device that includes a user-engageable link that enables viewing of a transaction history of the financial transaction.

* * * * *